C. E. GRIFFIN.
Scythe.
No. 85,380.
Patented Dec. 29, 1868.
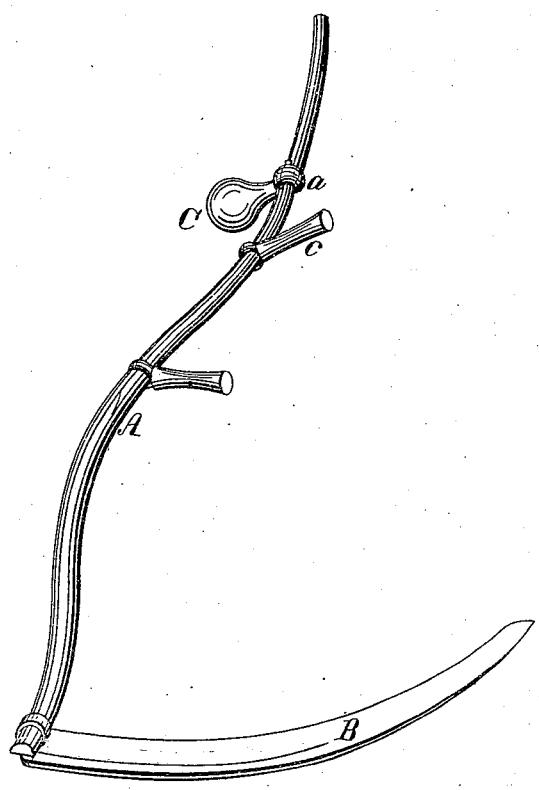

CHARLES E. GRIFFIN, OF ROSEVILLE, ILLINOIS.

*Letters Patent No. 85,380, dated December 29, 1868.*

IMPROVEMENT IN SCYTHES.

The Schedule referred to in these Letters Patent and making part of the same.

*To all whom it may concern:*

Be it known that I, CHARLES E. GRIFFIN, of Roseville, in the county of Warren, and State of Illinois, have invented a new and useful Improvement in Scythes; and I do hereby declare that the following is a full, clear, and exact description thereof, which will enable others skilled in the art to make and use the same, reference being had to the accompanying drawings, forming a part of this specification.

This invention consists in the application of a weight to the scythe-swath, to serve as a counterpoise for the same, and thereby greatly facilitate and lessen the labor of mowing.

The accompanying drawing represents a view of a scythe and swath, with my improvement applied to the latter.

A represents the scythe-swath, and

B, the scythe, the latter being attached to the former in the usual or any proper way.

On the swath A, there is secured a counterpoise, C. A cast-iron counterpoise, of globular form, would probably be as convenient as any, and it may weigh one and a half pound, more or less, according to the size and weight of the scythe and swath.

The counterpoise is provided with a ring or band, *a*, to fit on the swath, with a set-screw or key passing through it, to fasten the ring or band in position.

As a general rule, the counterpoise should be about four or five inches above the left-hand nib *c*, and hang about in line with said nib toward the earth.

This counterpoise facilitates the swinging of the scythe and the cutting of the grass, obviating in an eminent degree the side draught produced by the resistance offered by the grass to the action of the scythe, and thereby greatly diminishing the labor of mowing.

Having thus described my invention,

What I claim as new, and desire to secure by Letters Patent, is—

The application of a weight or counterpoise to a scythe-swath, substantially as and for the purpose set forth.

CHARLES E. GRIFFIN.

Witnesses:
 JOHN A. GORDON,
 MYRON W. GRIFFIN.